(12) United States Patent
Featherston et al.

(10) Patent No.: US 9,547,924 B2
(45) Date of Patent: Jan. 17, 2017

(54) COMPOSITE LAUNCH ACCEPTABILITY REGION SOFTWARE

(71) Applicant: Raytheon Company, Waltham, MA (US)

(72) Inventors: Katherine Featherston, Indianapolis, IN (US); Vincent A Maglio, Fishers, IN (US)

(73) Assignee: Raytheon Company, Waltham, MA (US)

( * ) Notice: Subject to any disclaimer, the term of this patent is extended or adjusted under 35 U.S.C. 154(b) by 287 days.

(21) Appl. No.: 14/313,157

(22) Filed: Jun. 24, 2014

(65) Prior Publication Data

US 2015/0369566 A1  Dec. 24, 2015

(51) Int. Cl.
*G06F 19/00* (2011.01)
*G06T 11/20* (2006.01)
*F41G 9/00* (2006.01)

(52) U.S. Cl.
CPC .............. *G06T 11/203* (2013.01); *F41G 9/002* (2013.01)

(58) Field of Classification Search
CPC .............. F41J 5/06; G05B 19/00; G06K 7/14; G06K 7/0166; G06K 7/10851; G06K 7/1443; G06K 19/06037; G06K 7/1417; G06K 7/10722

USPC ................. 235/400, 462.07, 462.08, 462.09, 462.1, 235/462.11, 494
See application file for complete search history.

(56) References Cited

U.S. PATENT DOCUMENTS

2008/0035730 A1\* 2/2008 Look ................ G06K 19/06037
235/462.07

\* cited by examiner

*Primary Examiner* — Karl D Frech
(74) *Attorney, Agent, or Firm* — Renner, Otto, Boisselle & Sklar, LLP (57) ABSTRACT

Software is provided for functioning in conjunction with a plurality of mission stores and for assisting a pilot of a vehicle with release of the mission stores to achieve a specified number of mission objectives. Each of the plurality of mission stores may be designated for communication with a separate mission reference point or target. The targets may be grouped within a common target area. The software provides processor-executable instructions for determining acceptable timing and location for release of the plurality of mission stores, such as within the common target area, and such that the mission stores achieve communication with the respective mission reference points. The processor-executable instructions calculate and identify a common release area within the common target area, such as a composite launch acceptability region of overlap of separate target regions of each mission store, in addition to identifying an entrance and exit point of the composite region.

20 Claims, 8 Drawing Sheets

COMPOSITE LAUNCH ACCEPTABILITY REGION SOFTWARE

FIELD OF INVENTION

The present invention relates generally to targeting software, and more particularly to software for determining with regards to a plurality of payloads an acceptable timing and location for release of a plurality of payloads such that a specified number of the plurality of payloads achieve mission objectives, such as reaching individual specified targets.

BACKGROUND

Vehicles for releasing payloads often include software for assisting a pilot in achieving mission objectives, such as hitting a target with an explosive. For example, a vehicle, such as an airplane, typically includes software for assisting a pilot with locating and directing mission stores, which may include explosives, at such a target. The mission stores may be munitions or payloads, such as bombs (e.g., smart bombs), drop shipments, targeting devices, etc. A typical vehicle for releasing munitions or payloads often includes a processor for reading and executing processor-executable instructions contained in a computer-readable medium. The processor is often a component of the complicated electronics of a vehicle's cockpit, dashboard electronics system, or mission store carriage system.

SUMMARY OF INVENTION

The present invention provides a unique software for assisting a pilot of a vehicle with release of a plurality of mission stores such that a specified number of mission objectives are achieved. Particularly, each of the plurality of mission stores may be designated for communication with a separate mission reference point, such as a target. The targets may be grouped within a common area. The software includes processor-executable instructions for determining acceptable timing and location for simultaneous or near simultaneous release of the plurality of mission stores, such as within the common area, or such that each of the plurality of mission stores, or a substantial majority of the plurality of mission stores, achieves communication, such as physical contact, with the respective mission reference points.

The processor-executable instructions provide for identifying a plurality of reference targets and defining a target region about each target where a mission store, such as a payload or munition, may be released such that it will communicate with said target, thus achieving a mission objective. The program identifies a composite launch acceptability region of overlap of the target regions, including an entrance and exit point of the composite region, such that two or more of the plurality of mission stores may be simultaneously or nearly simultaneously released when the vehicle is located in the composite region, thereby enabling each of the two or more mission stores to reach its target.

According to one aspect, a computer-readable medium is provided having processor-executable instructions implementable to calculate a composite launch acceptability region. The computer-medium includes forming a plurality of initial polygons, each including one of a plurality of target reference points, and each defined by a plurality of interconnected segments and forming an intersection polygon, the input polygon including an area of overlap of each of the plurality of initial polygons. The computer-readable medium further includes overlaying a set of points over the intersection polygon and forming about each of the set of points a test polygon having a different number of sides as compared to the intersection polygon, identifying a test polygon including the greatest area of coverage of the intersection polygon, and outputting the test polygon as the composite launch acceptability region.

The computer-readable medium may further include receiving a vector input, calculating based on the vector input an entry point and an exit point of the vector through the composite launch acceptability region.

Each initial polygon may be formed by extending from the respective target reference point a plurality of radials, the radials extending to distal vertices, and the distal vertices being interconnected by line segments to form the respective initial polygon.

For each initial polygon, the plurality of radials may be equally circumferentially spaced.

A first radial of the plurality of radials may be directed in a direction opposite a direction of travel of the vehicle, and wherein the other of the plurality of radials are equally-circumferentially spaced with regards to the first radial.

Each radial of the plurality of radials may extend a different length from the respective target reference point.

The computer-readable medium may further include removing any one of the plurality of initial polygons that completely encompasses another one of the plurality of initial polygons.

The forming of a test polygon may include extending a plurality of radials from the respective test point, the radials each intersecting the intersection polygon.

The forming of an intersection polygon may include selecting a first initial polygon and tracing along the first initial polygon until reaching an intersection with a second initial polygon, continuing tracing along a chosen line segment of the first or second initial polygon where the chosen line segment is located in or on each of the first or second initial polygons, continuing tracing along the initial polygon including the chosen line segment until reaching another intersection of the first and second initial polygons, and continuing to toggle between tracing of the first initial polygon and tracing of the second initial polygon until an intersection polygon is fully traced, the intersection polygon which is an overlapping area of each of the first and the second initial polygons.

The computer-readable medium may further include analyzing a test polygon to determine if the test polygon includes a portion of its area that is disposed outside of the intersection polygon.

The computer-readable medium may further include adjusting a side of the test polygon to place the side within the intersection polygon, thus eliminating the portion of the test polygon area that is disposed outside of the intersection polygon.

The computer-readable medium may further include analyzing a test polygon to determine if the test polygon includes a portion of its area that is disposed outside of the intersection polygon, and adjusting the length of one or more radials of the test polygon to eliminate the portion of the test polygon area that is disposed outside of the intersection polygon.

According to another aspect, a computer-readable medium is provided having processor-executable instructions implementable to calculate a composite launch acceptability region. The computer-readable medium includes forming a plurality of initial polygons, each including one of a plurality of target reference points, and each defined by a plurality of interconnected segments and forming an intersection polygon, the input polygon including an area of overlap of each of the plurality of initial polygons. The computer-readable medium also includes forming an intersection polygon. The forming of an intersection polygon includes selecting a first initial polygon and tracing along the first initial polygon until reaching an intersection with a second initial polygon, and continuing tracing along a chosen line segment of the first or second initial polygon where the chosen line segment is located in or on each of the first or second initial polygons. The forming of an intersection polygon further includes continuing tracing along the initial polygon including the chosen line segment until reaching another intersection of the first and second initial polygons, and continuing to toggle between tracing of the first initial polygon and tracing of the second initial polygon until an intersection polygon is fully traced, the intersection polygon including an overlapping area of each of the first and the second initial polygons. The computer-readable medium further includes outputting a polygon including only overlapped portions of two or more of the initial polygons as the composite launch acceptability region.

The computer-readable medium may further include receiving a vector input, calculating based on the vector input an entry point and an exit point of the vector through the composite launch acceptability region.

Each initial polygon may be formed by extending from the respective target reference point a plurality of radials, the radials extending to distal vertices, and the distal vertices being interconnected by line segments to form the respective initial polygon.

For each initial polygon, the plurality of radials may be equally circumferentially spaced.

The computer-readable medium may further include removing any one of the plurality of initial polygons that completely encompasses another one of the plurality of initial polygons.

According to yet another aspect, a computer-implemented method of forming a composite launch acceptability region from a plurality of separate target launch acceptability regions is provided. The computer-implemented method includes forming a plurality of initial polygons representing the plurality of separate target launch acceptability regions, each including one of a plurality of target reference points, and each defined by a plurality of interconnected segments, and forming an intersection polygon, the input polygon including an area of overlap of each of the plurality of initial polygons. The computer-implemented method also includes overlaying a set of points over the intersection polygon and forming about each of the set of points a test polygon having a different number of sides as compared to the intersection polygon, identifying a test polygon including the greatest area of coverage of the intersection polygon, and outputting the test polygon as the composite launch acceptability region.

Each initial polygon may be formed by extending from the respective target reference point a plurality of radials, the radials extending to distal vertices, and the distal vertices being interconnected by line segments to form the respective initial polygon.

The forming of an intersection polygon may include selecting a first initial polygon and tracing along the first initial polygon until reaching an intersection with a second initial polygon, continuing tracing along a chosen line segment of the first or second initial polygon where the chosen line segment is located in or on each of the first or second initial polygons, continuing tracing along the initial polygon including the chosen line segment until reaching another intersection of the first and second initial polygons, and continuing to toggle between tracing of the first initial polygon and tracing of the second initial polygon until an intersection polygon is fully traced, the intersection polygon including an overlapping area of each of the first and the second initial polygons.

The foregoing and other features of the invention are hereinafter described in greater detail with reference to the accompanying drawings.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

A composite launch acceptability region (CLAR) software program is configured for storage in a computer-readable medium, the program for functioning in conjunction with a plurality of mission stores. The CLAR program assists a user with release of the plurality of mission stores, such that a specified number of mission objectives are achieved. For example, the software program may assist a pilot of an airplane by identifying a particular flight area within which a plurality of bombs may be simultaneously or near-simultaneously released from the airplane such that all or a majority of targets will be hit by the plurality of bombs. More particularly, the software program generally defines a fly-to point and a region about that point, where a pilot may release the plurality of bombs when located at that fly-to point or region, such that release within this region provides the pilot with the greatest calculated possibility to hit, such as to destroy, a plurality of targets.

While the description detailed herein is described in conjunction with a plurality of bombs or other munitions, such as a plurality of smart bombs, and in conjunction with a plane or jet for dropping the plurality of bombs or other munitions, the description is also applicable to other suitable uses. For example, it will be appreciated that the software program herein described may be utilized to assist other users, such as drivers or co-pilots, and may be used in conjunction with aircraft, sea-craft, or land-craft other than planes or jets, such as boats, wheeled launch units, helicopters, drones, submersibles, etc. It will also be appreciated that the software program may be used for numerous types of releasing, such as dropping, deploying, ejecting, launching, etc. the plurality of mission stores, which may or may not include an explosive payload or munitions, such as missiles, bombs, rockets, supply containers, parachuted payloads (e.g., supplies, troops, etc.), radar, targeting or navigational devices, etc. The mission stores when released may communicate with the targets, and the communication may include contacting, damaging, destroying, or otherwise coming into direct or indirect communication with the targets, including communication adjacent or contiguous with the targets.

Figure 1:
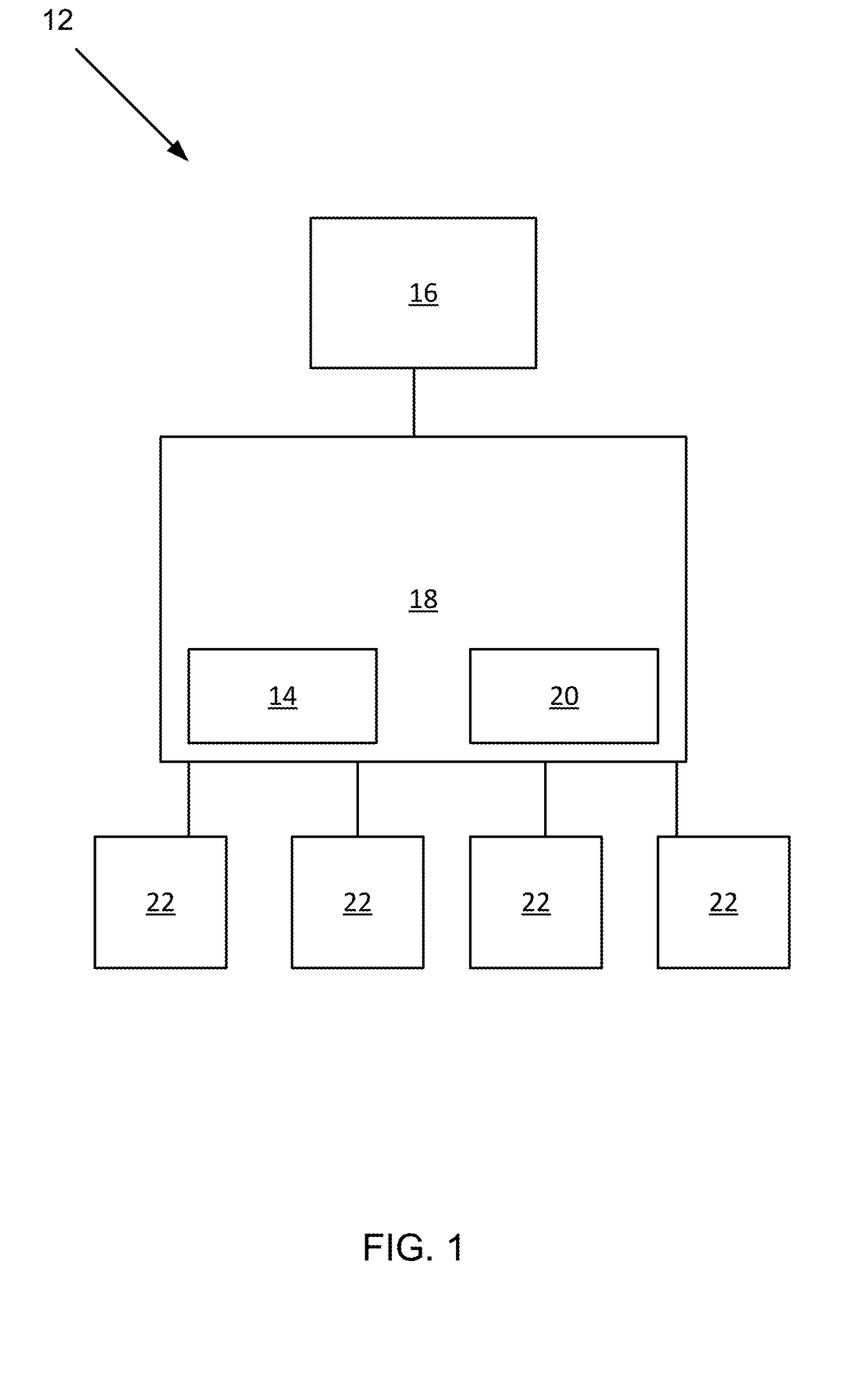
FIG. 1 illustrates a schematic representation of an aircraft for using software according to the invention.

Accordingly, in one example, the software program according to the invention may be accessed or stored in a portion of a plane for dropping smart bombs or other munitions. Referring to FIG. 1, the plane 12 is illustrated in a block diagram, and may include a controller 14, which may include a processor, computer, or other suitable device for reading and executing the CLAR software. The controller 14 may be located in the cockpit 16. Alternatively, the controller 14 may be located in another suitable location of the plane 12 as shown in the embodiment of FIG. 1, where the controller 14 is shown integral with a mission store carriage system 18, such as a bomb rack, launcher, etc. The CLAR software may be provided in an electronic medium 20 in the carriage system 18 and the controller 14 may be communicatively coupled to the carriage system 18, and thus to the electronic medium 20. Although not specifically shown, the CLAR software instead may be included in a computer-readable medium integral with the cockpit 16 or in another suitable location of the plane 12.

The carriage system 18 includes a plurality of ports for storing the plurality of smart bombs 22, which are communicatively coupled to the carriage system 18, and thus to the controller 14. Thus in the embodiment of FIG. 1, the bombs 22 are communicatively coupled to the carriage system 18, which is communicatively coupled to the cockpit 16 of the airplane 12.

In one embodiment, the smart bombs and/or the carriage system are configured to function in conjunction with the CLAR software in order to provide accurate release of the smart bombs from the carriage system. The smart bombs and/or the carriage system may provide a plurality of information for input to the CLAR software. For example, the inputs may include a target reference point for each of the smart bombs, and also a launch acceptability region for each of the smart bombs. The launch acceptability region (LAR) of each bomb is a geographical representation of an area in which the bomb must be released from the carriage system in order for the smart bomb to be capable of maneuvering, such as gliding, to its respective target reference point. The LAR, while represented as a region on the surface spatially located below the plane, is translated to an elevation of the plane. Thus the plane will "enter" and "exit" the LAR, with the bomb being released when the plane is located in the LAR. The bomb may be released automatically by the controller or by another controller upon entry into the LAR, or alternatively, the pilot may directly or indirectly cause release of the bomb.

Moreover, as the carriage system may include one or more bombs, such as a plurality of bombs, the CLAR software includes processor-executable instructions for assisting the pilot in releasing two or more of the plurality of bombs during a given period. During flight it is typically difficult for a pilot to account for and recall numerous LARs for numerous bombs, and to determine how to most quickly and efficiently enter a LAR and release bombs in what may be dangerous flight areas. Thus, the CLAR software assists the pilot by calculating for numerous entry vectors the greatest composite LAR (CLAR), which is the overlap of each LAR of the two or more bombs, or overlap of multiple subsets of the LARs of the two or more bombs, at which the two or more bombs may be released and be capable of separately hitting their targets.

Figure 2:
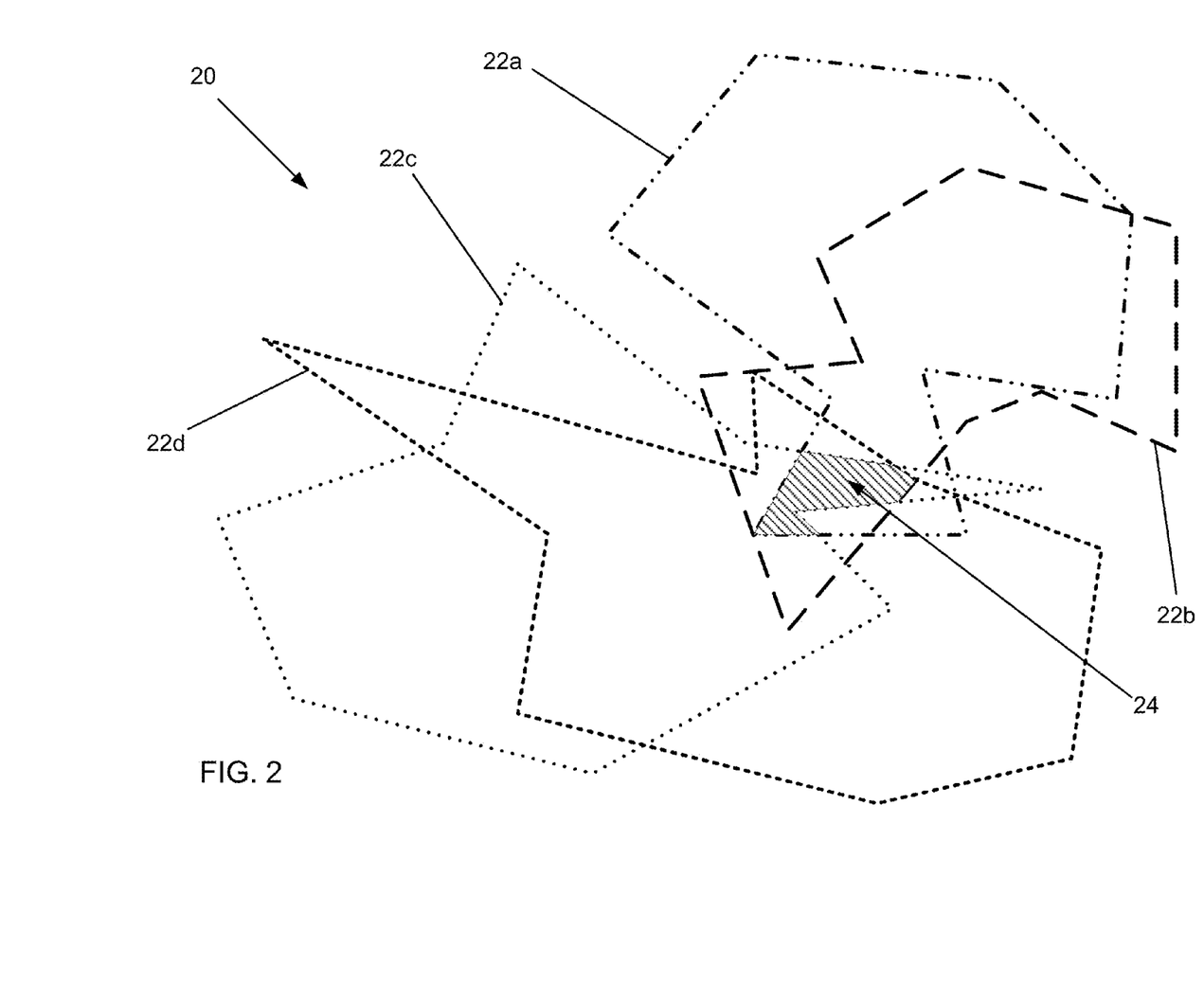
FIG. 2 illustrates an exemplary display output of software according to the invention.

The display output of the CLAR software is provided as data input to a system of the cockpit of the plan, such as for a display as depicted for example in FIG. 2. The display 20 includes a plurality of LARs 22a-22d, overlapping to form the CLAR 24.

The output of the CLAR software also includes an entry and exit point of the CLAR, which may be based on the plane's current vector heading, projected vector heading, or other vector heading provided by the pilot, co-pilot, or an electronic navigational controller. The CLAR software is also configured to receive navigational inputs from other systems of the plane, the inputs including wind speed and direction, plane vector, elevation, and velocity, etc.

When in the CLAR, the bombs may be released substantially simultaneously, nearly-simultaneously, in a timed order where the bombs or other munitions are released one after another in a ripple timing pattern, or in any other suitable order with any other suitable timing. This release decision may be based on the most efficient method for enabling each bomb to hit its target, taking into account a time between initial release of the bomb and the initiation of maneuvering procedures of each respective smart bomb. The carriage system or the bombs themselves may provide this release decision to the CLAR software as yet another input, or the release may be initiated by the pilot or other user.

The processor-executable instructions output by the CLAR software may be best appreciated with reference to the flow diagrams of FIGS. 3 and 6-8, which for purposes of simplicity of explanation are shown and described as a series of blocks. The methodologies are not limited by the order of the blocks, as some blocks can occur in different orders or concurrently with other blocks from that shown or described, such as in parallel or in series with other blocks. Moreover, less than all the illustrated blocks may be required to implement an example methodology. Furthermore, additional or alternative methodologies can employ additional, non-illustrated blocks.

As used herein, software includes but is not limited to, one or more computer or processor instructions that can be read, interpreted, compiled, or executed and that cause a computer, processor, or other electronic device to perform functions, actions or behave in a desired manner. The instructions may be embodied in various forms like routines, algorithms, modules, methods, threads, or programs including separate applications or code from dynamically or statically linked libraries. Software may also be implemented in a variety of executable or loadable forms including, but not limited to, a stand-alone program, a function call (local or remote), a servlet, an applet, instructions stored in a memory, part of an operating system or other types of executable instructions. It will be appreciated by one of ordinary skill in the art that the form of software may depend, for example, on requirements of a desired application, the environment in which it runs, or the desires of a designer/programmer or the like. It will also be appreciated that computer-readable or executable instructions can be located in one logic or distributed between two or more communicating, co-operating, or parallel processing logics and thus can be loaded or executed in series, parallel, massively parallel and other manners.

The CLAR software is executed by, such as stored in, read, and run by, any suitable computer-readable medium, which herein refers to any suitable medium that participates in directly or indirectly providing signals, instructions, or data. The computer-readable medium may take forms, including, but not limited to, non-volatile media, volatile media, and/or transmission media.

In the flow diagrams, blocks denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

Figure 3:
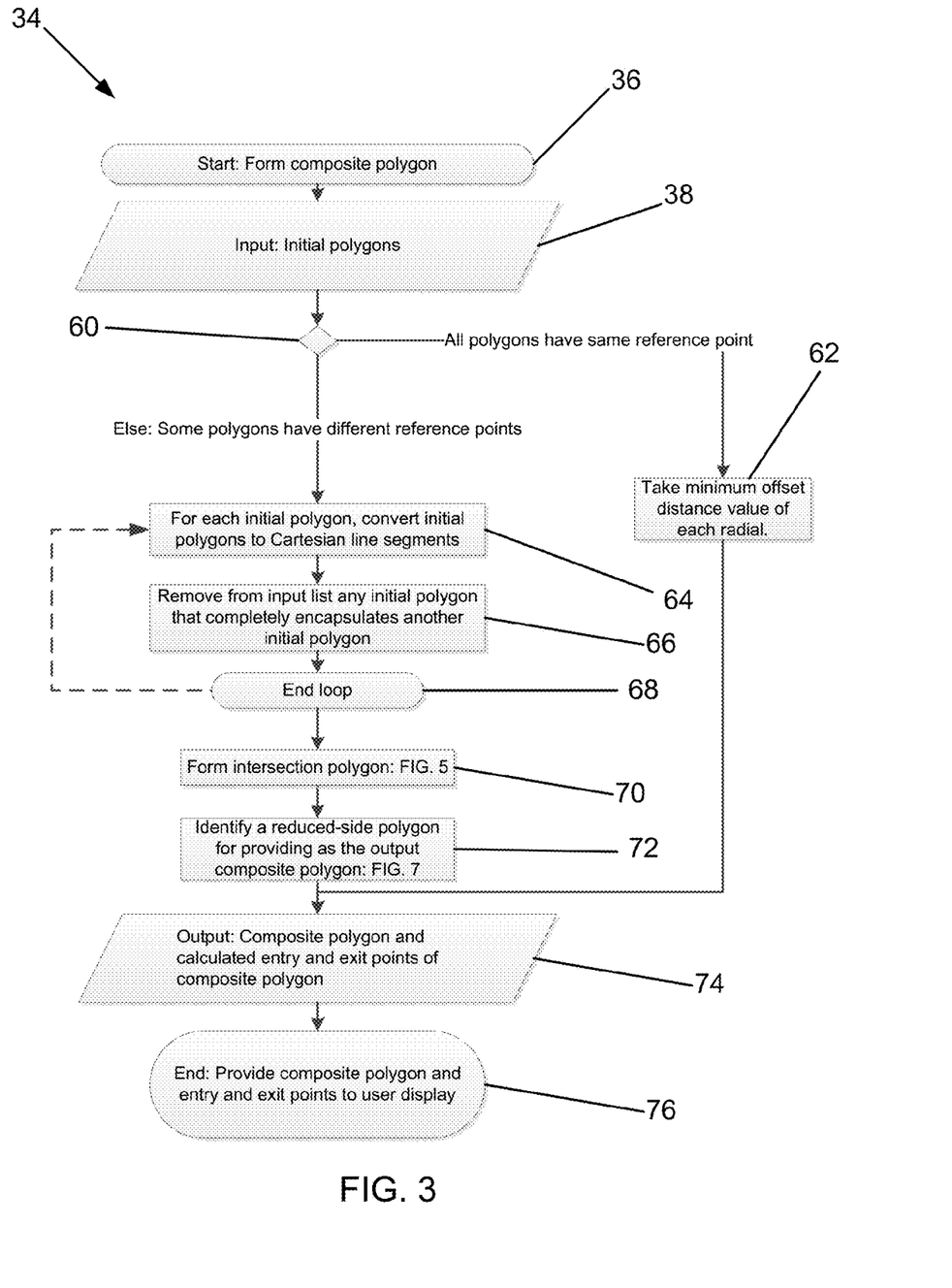
FIG. 3 illustrates an exemplary logic output of software according to the invention, the logic output including a set of processor-executable instructions.

Turning now to FIG. 3, a portion of the CLAR software program according to the invention is shown in the form of an exemplary set 34 of processor-executable instructions, which are output and executable by the CLAR software program. In one example, a computer-readable medium may store the CLAR software operable to perform a method that includes the exemplary set of instructions 34 shown in FIG. 3. As mentioned, the computer-readable medium may be provided integral with a processor of a carriage system, alternatively integral with a controller, or provided in any other suitable electronic device of an airplane, or other subject vehicle.

After receiving initial inputs, such as navigational inputs from the plane, the instructions 34 begin at start block 36, where the CLAR software provides for the formation of the composite LAR (CLAR). At block 38, the software receives input LARS, to be later merged to form the composite LAR. The step of block 38 includes two or more LARs being provided to the CLAR software in the form of polygons, also herein referred to as polygons or LARS, of any suitable shape or having any suitable number of sides. The LARs are each formed based off of a target reference point for each of the bombs or munitions. More particularly, the aircraft may provide a target reference point to each mission store via communicative coupling of the aircraft's electronic systems with the carriage system. The aircraft may receive the target reference points from the pilot, via communication to the aircraft, etc. The target reference points may be in reference to satellite data or to a previously recorded geographical image. Each mission store in response may generate a LAR that it provides to the carriage system, and which are collectively delivered as the LAR inputs to the CLAR software. Alternatively, the mission stores may be configured to generate the LARs and to input the LARs into the CLAR software either directly or via the carriage system.

Figure 4:
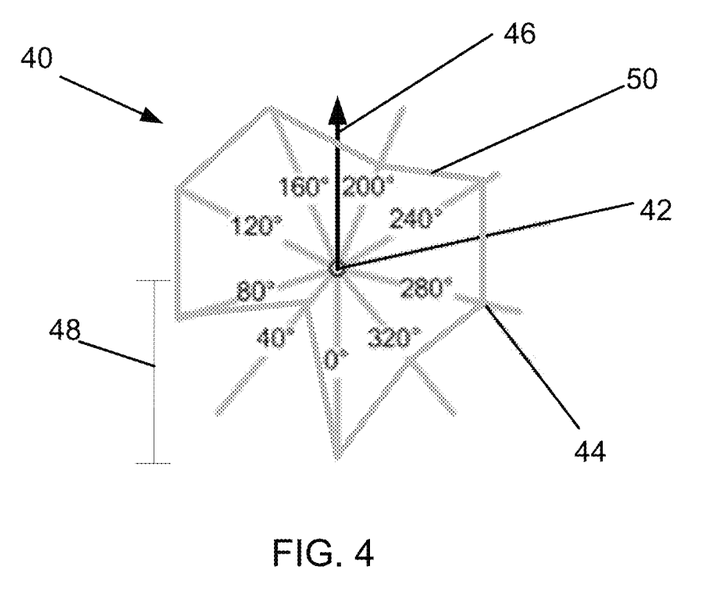
FIG. 4 illustrates an exemplary depiction of the formation of an initial polygon provided as an input into or an output from the exemplary set of processor-executable instructions of FIG. 3.

As shown in FIG. 4, an exemplary LAR 40 includes an initial target reference point 42. The initial reference point 42 has extending therefrom nine radials 44, although any suitable number of radials may extend therefrom. In the illustrated embodiment, radials 44 are equally circumferentially spaced at 40 degree offset angles, although any other suitable spacing may be specified. A first radial is located at 0 degrees, extending in a direction 180 degrees from, or opposite from, the current or projected vector 46 of the plane, which is provided as an input into the CLAR software. Each radial 44 includes an offset length, such as the offset length 48 of the 0 degree radial 44. The offset length of each radial 44 may be identical or some or all of the offset lengths may be different. This is because each offset length is provided as an input to the CLAR software based on the environmental conditions and release area at which each respective bomb may be released while still being capable of hitting its target reference point, which is represented by initial reference point 42. An endpoint of each radial is formed at an end of each offset length opposite the reference point 42. The endpoints of the radials 44 are connected by line segments 50 to form the initial polygon LAR 40, illustrated here as a nine-sided polygon LAR.

Figure 5:
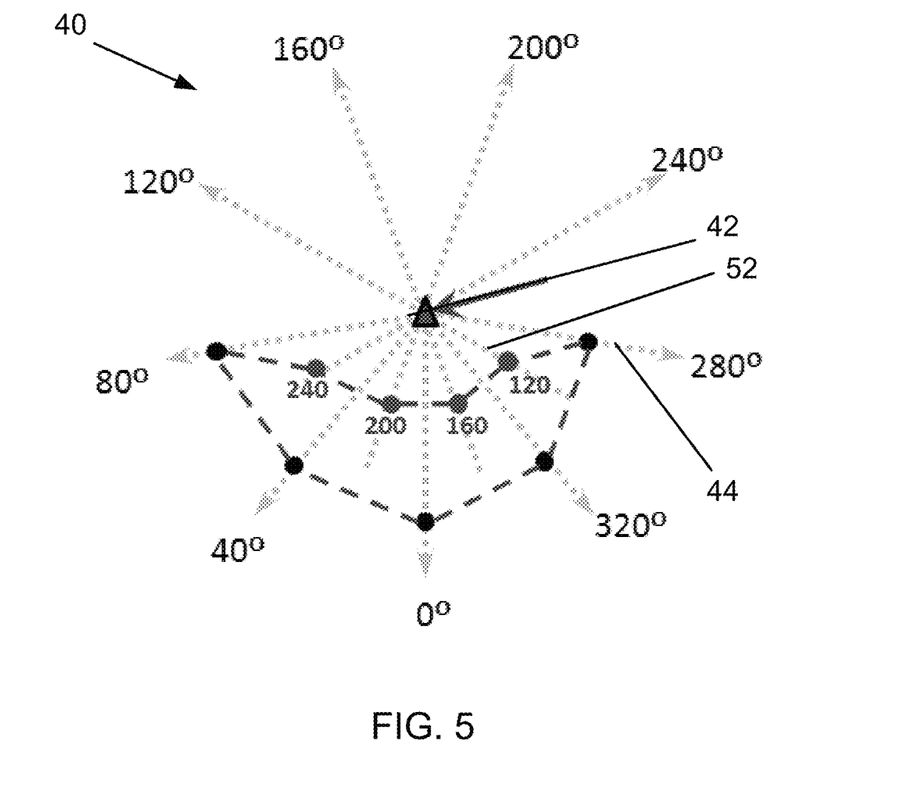
FIG. 5 illustrates another exemplary depiction of the formation of an initial polygon provided as an input into or an output from the exemplary set of processor-executable instructions of FIG. 3.

The initial reference point 42 may not be located within a polygon, such as depicted in another exemplary initial polygon 40, shown in FIG. 5. In such case, the bomb or carriage system may determine that a geographical location of contact to achieve a particular mission objective may be located adjacent to but not including the reference point 42, as depicted in FIG. 5. Additionally or alternatively, depending on the environmental conditions and release area of a respective bomb, the initial polygon 40 of FIG. 5 may be formed by both positive radials 44 and negative radials 52. A negative radial 52 is a radial extending 180 degrees opposite a positive radial 44. For example, in FIG. 5 the 120 degree positive radial 44 is translated into a −60 degree negative radial 52, extending opposite the 120 degree positive radial 44.

Returning to FIG. 3, after receipt of the initial 2 or more LAR polygons in block 38, also referred to as 2 to N polygons, with N being any number greater than 2, the CLAR software makes a determination, represented by decision block 60, as to whether all the initial polygons have the same target reference point, or whether different reference points exist. If all polygons have the same reference point, the software proceeds to create a final composite polygon. For example, the CLAR software will analyze all initial polygons and take the minimum offset distance value of each radial to form the largest possible composite polygon encompassing a portion of each of the initial polygons (block 62).

As is more likely the case, at least some polygons will have different initial reference points. The CLAR software then proceeds to a loop including blocks 64, 66 and 68. The polygon segments of each initial polygon are converted to Cartesian line segments from polar coordinate segments, forming an initial polygon input list (block 64), although the CLAR software may be configured to read Cartesian coordinates, and/or the initial polygons may instead be provided in polar coordinates. The converted initial polygons are analyzed to determine whether any of the initial polygons completely encapsulates or encompasses another initial polygon. At block 66, any initial polygon that encapsulates another initial polygon is removed from the input list, thus leaving the encapsulated initial polygon, which is the largest overlapped area of the removed/encapsulating polygon and the encapsulated polygon. This process continues until all encapsulating polygons are removed, ending the loop at block 68.

Once the input list of initial polygon LARs is revised, an intersection polygon LAR will be formed from the initial polygon LARs (block 70). The intersection polygon will be composed of an overlap area of each of the remaining initial polygon LARs. The intersection polygon may have a greater number of sides than an initial polygon. In block 72, an output composite polygon LAR is formed substantially within the intersection polygon LAR based on a single reference point within or outside of the intersection polygon LAR. Thus, the composite LAR is generally a polygon including only overlapped portions of two or more of the initial polygons as the composite launch acceptability region. Numerous composite polygons may be formed prior to deciding on the most efficient output composite polygon. The output composite polygon may be a reduced-side polygon as compared to the intersection polygon. In this way, a reduced-side composite polygon may be provided to the pilot as the output composite polygon.

The composite polygon LAR is provided as a data output which may be displayed, such as in a cockpit display, with calculated entry and exit points of the aircraft into and out of the composite LAR (CLAR) also being provided (block 74), also such as to a cockpit display (block 76). The CLAR software may be configured to convert the coordinate system of the CLAR being provided to the pilot, such as to convert from polar to Cartesian coordinates or vice versa.

The CLAR software may simultaneously process numerous parallel instruction sets, such as a first instruction set based upon a current vector towards the initial target reference points, a second instruction set based on a projected vector towards the initial target reference points, and a third instruction set based on a user inputted suggested vector towards the initial target reference points. For each of the first, second, and third instruction sets, the CLAR software may also simultaneously process numerous parallel subsets of instructions. For example the software may analyze different groupings of the initial target reference points, such as a first group including a first set of targets, a second group including only a portion of the first set of targets, and a third group including only a portion of the first set of targets in addition to additional initial targets not included in the first and second sets of targets.

Figure 6:
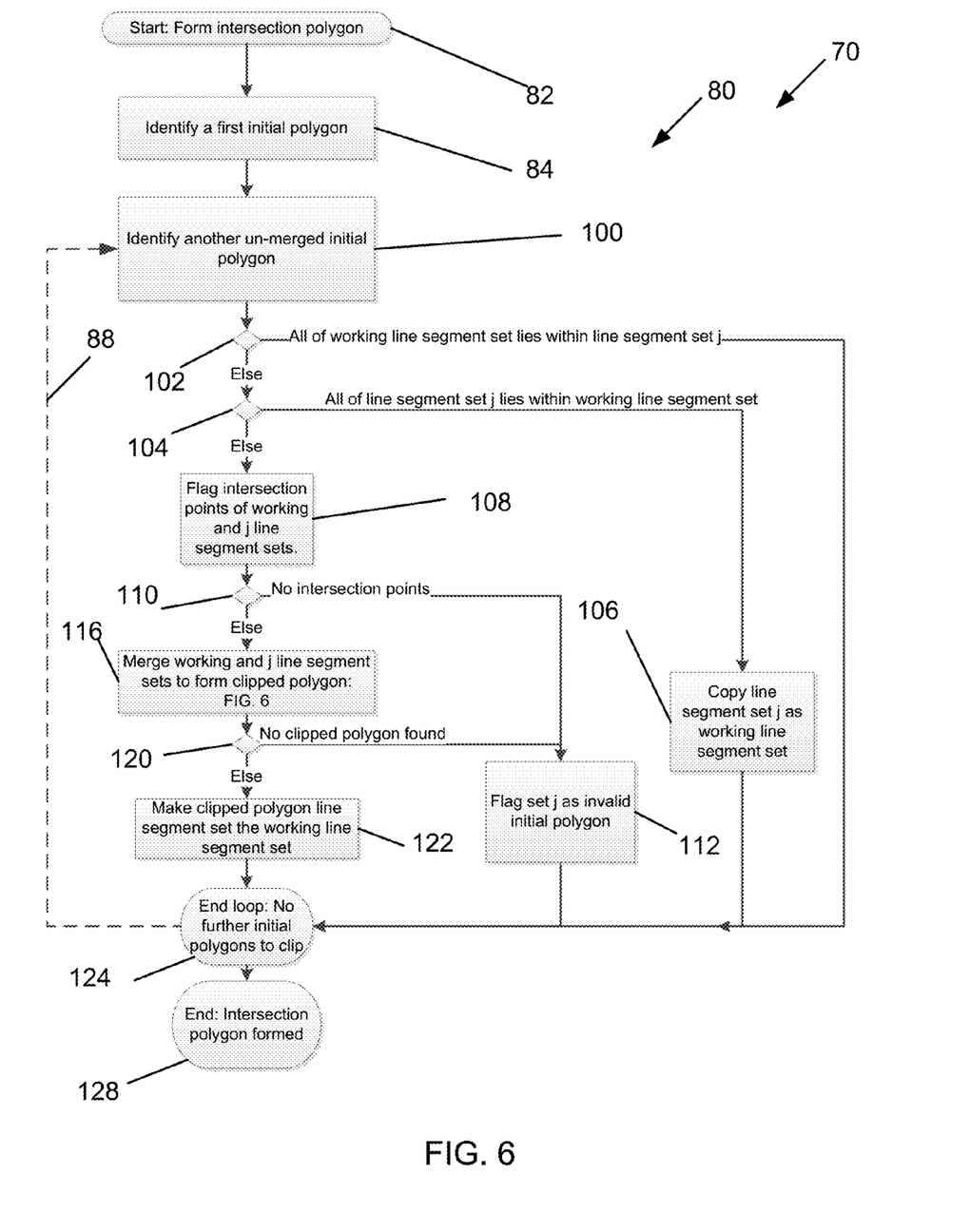
FIG. 6 illustrates a portion of the exemplary set of processor-executable instructions of FIG. 3.

Turning now to FIG. 6, a unique instruction subset 80 of the instructions 34 of the CLAR software is provided for forming the intersection polygon LAR, which is an overlapped area of the initial polygon LARS. The subset/subroutine 80 is performed as part of block 70 (FIG. 3). Block 82 represents the start of the subroutine for forming the intersection polygon LAR. A line segment set of a first polygon LAR is identified (block 84). The first polygon LAR may be a randomly identified LAR or a first in the input list created by the software. Alternatively, the topmost and leftmost initial polygon LAR may be identified as having the first line segment set. The topmost and leftmost designations may be with reference to a layout of the initial LARS aligned with a true north heading at the top of the layout, aligned with the current or projected vector heading directed toward the top of the layout, or any other suitable alignment. Any other suitable method may be used to identify the first polygon LAR to analyze, such as first analyzing the southernmost LAR.

Next, a loop 88 cycles through a set of instructions for forming a clipped polygon line segment set from the working set and from another polygon line segment set, labeled set j and also referred to as the j set. Once the clipped polygon is formed, another clipped polygon is then formed from the previously formed clipped polygon and another polygon line segment set, again labeled set j. This loop continues until all polygons are analyzed for formation of a final clipped polygon, also herein referred to as the intersection polygon.

Loop 88 begins at block 100 with the identification of the j set. The CLAR software identifies the working segment set, and then identifies another un-merged initial polygon LAR as the j set. As with the first polygon identified, any suitable method of identification may be used by the CLAR software. The CLAR software then determines whether all of the working set lies within the j set (block 102). If the working set lies within j set, the first loop is finished, and the designation of the j set is dropped because the working set polygon is the overlap of the working set and the previous j set. Another loop 88 then begins.

On the other hand if the working set does not lie fully within the j set, a second determination is made as to whether the j set instead lies fully within the working segment set (block 104). If the answer is yes, the working set designation is dropped and the j set receives the working set designation (block 106), because the j set is the common overlap area of the j set and the previous working set. Another loop 88 then begins.

If neither working line segment set or j set lies fully within the other, all intersection points of the two line segments sets are flagged (block 108). A determination is made verifying that intersection points exist at block 110. If no intersection points exist, the j set is flagged as an invalid polygon at block 112, the j set designation is dropped, and another loop 88 then begins. If intersection points are found, the line segment sets (working set and set j) are merged to form a first clipped polygon (block 116). A determination is then made to verify that a clipped polygon is actually output from step/block 116, at block 120. If no clipped polygon is found, block 112 is reached and the j set is flagged as invalid. If on the other hand a clipped polygon is found, the clipped polygon line segment set is designated the working segment set at block 122. The current loop 88 ends and another loop 88 begins, merging the clipped polygon/working line segment set with another j set.

Once there are no further initial polygons to clip remaining from the input list, the loop 88 is ended at step/block 124. The output of the subroutine 80 is reached at block 128 with the final clipped polygon being designated the intersection polygon.

Figure 7:
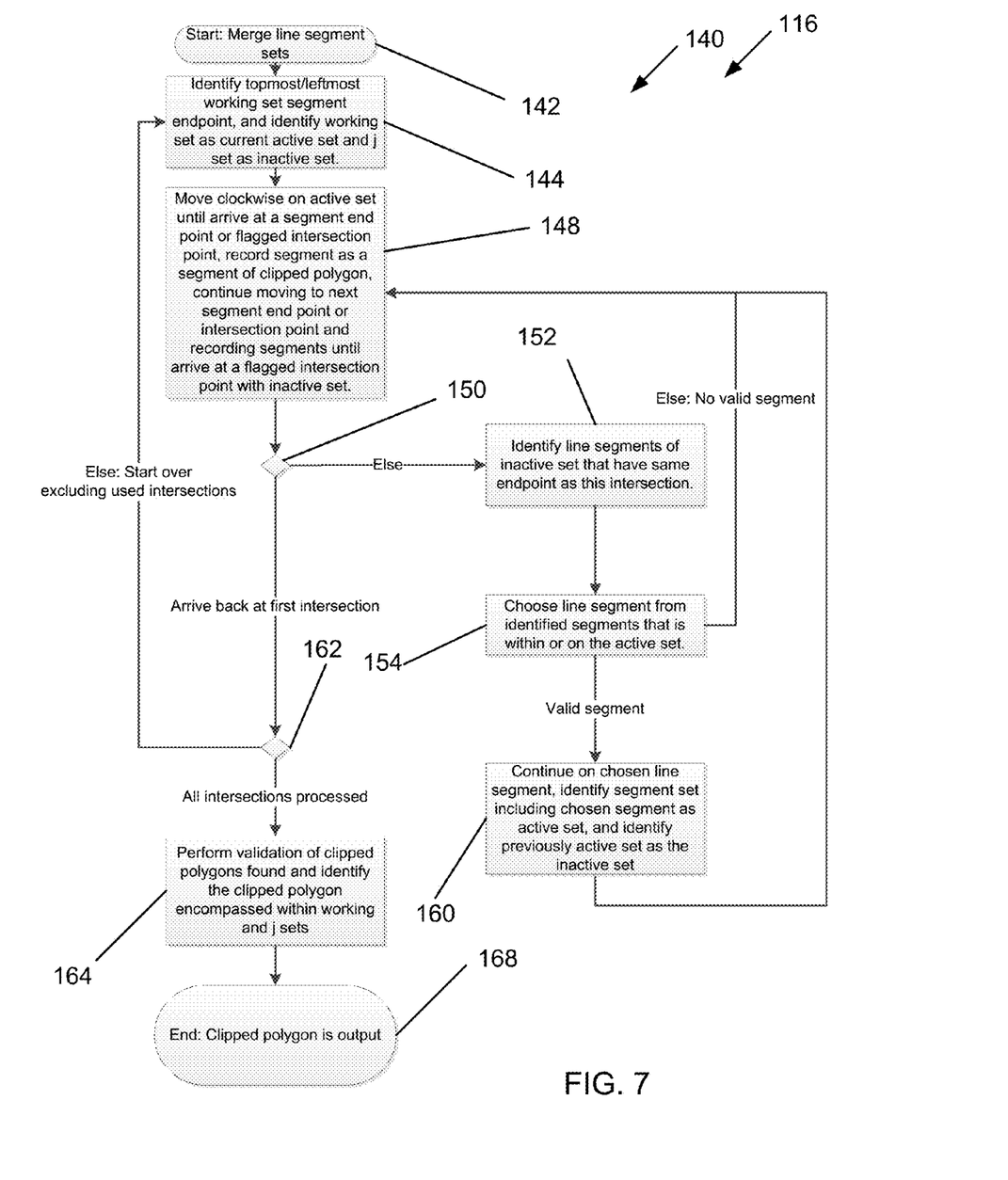
FIG. 7 illustrates a portion of the exemplary set of processor-executable instructions of FIG. 6.

Turning now to FIG. 7, the subroutine instructions/steps of block 116 for merging a working segment set and a j set are illustrated in further detail. A unique instruction subset 140 of the instructions 34 is provided for merging a working line segment set with a j set to form a clipped polygon. The subset 140 is performed as part of block 116 (FIG. 6).

Block 142 represents the start of the subroutine for merging the segment sets. The next block, block 144, provides for the CLAR software to identify the topmost/leftmost working set segment endpoint and to designate the working set polygon the active set polygon (i.e., the set currently being traced by the CLAR software). Alternatively, the CLAR software may be configured to identify any other working set segment endpoint as a starting endpoint, as previously mentioned. The j set polygon is then designated as the inactive set (i.e., the set not currently being traced by the CLAR software). Next, block 148 identifies a set of steps which are grouped together for simplicity. Block 148 includes the instructions of moving clockwise on the active set until arriving either at a segment end point of the active set or at a flagged intersection between the active set and the inactive set. Alternatively, the CLAR software may be configured such that block 148 includes the instructions of moving counter-clockwise on the active set. Regardless at which point the CLAR software arrives, the traced segment is recorded, or clipped, as a segment of the clipped polygon being created via the merging of the working set and the j set. If arriving at an intersection point, the software moves to decision block 150. Otherwise, the software continues moving to the next point and recording segments until arriving at a flagged intersection point.

At decision block 150, the CLAR software determines whether the intersection point is the first intersection or a new intersection. If it is a new intersection, the software moves to block 152. At block 152, the intersected segment of the inactive set is identified as two separate segments, separated by the intersection point. At block 154, if neither segment of the two separate segments of the inactive set is on or within the active set, there is no valid segment, and the CLAR software continues tracing along the active segment set and returns to block 148. On the other hand, if one of the segments of the two separate segments is on or within the active set, the segment which is on or within the active set is designated for tracing (block 154). The CLAR software thus begins tracing along the designated segment, and thus begins tracing along the inactive segment set. The inactive segment set is identified as the active segment set (i.e., the segment along which tracing is progressing), and the previously active set is identified as the inactive set (block 160). This loop continues, toggling between the working set and the j set, until the determination that the tracing or clipping process has arrived back at the first intersection (decision block 150).

After arriving back at the first intersection, a validation determination is made at block 162 to determine whether all flagged intersections of the working and the j set have been processed. If intersections were passed up, the process continues at block 148. If, however, all intersections were processed, all polygons clipped from the tracing process are validated (block 164). More than one clipped polygon may have been formed. Thus, only the clipped polygon encompassed within the working set and the j set is identified and provided as an output at block 168 of instruction subset 140. As previously mentioned, this clipped polygon will be merged with another designated j set of line segments per the instruction subset 80 of FIG. 6.

In summary of instruction subset 140, forming an intersection polygon includes selecting a first initial polygon and tracing along the first initial polygon until reaching an intersection with a second initial polygon, continuing tracing along a chosen line segment of the first or second initial polygon where the chosen line segment is located in or on each of the first or second initial polygons, continuing tracing along the initial polygon including the chosen line segment until reaching another intersection of the first and second initial polygons, and continuing to toggle between tracing of the first initial polygon and tracing of the second initial polygon until an intersection polygon is fully traced, the intersection polygon including an overlapping area of each of the first and the second initial polygons. Additional polygons may be merged into the intersection polygon, such that a final intersection polygon includes an overlapping area of a plurality of initial polygons.

Figure 8:
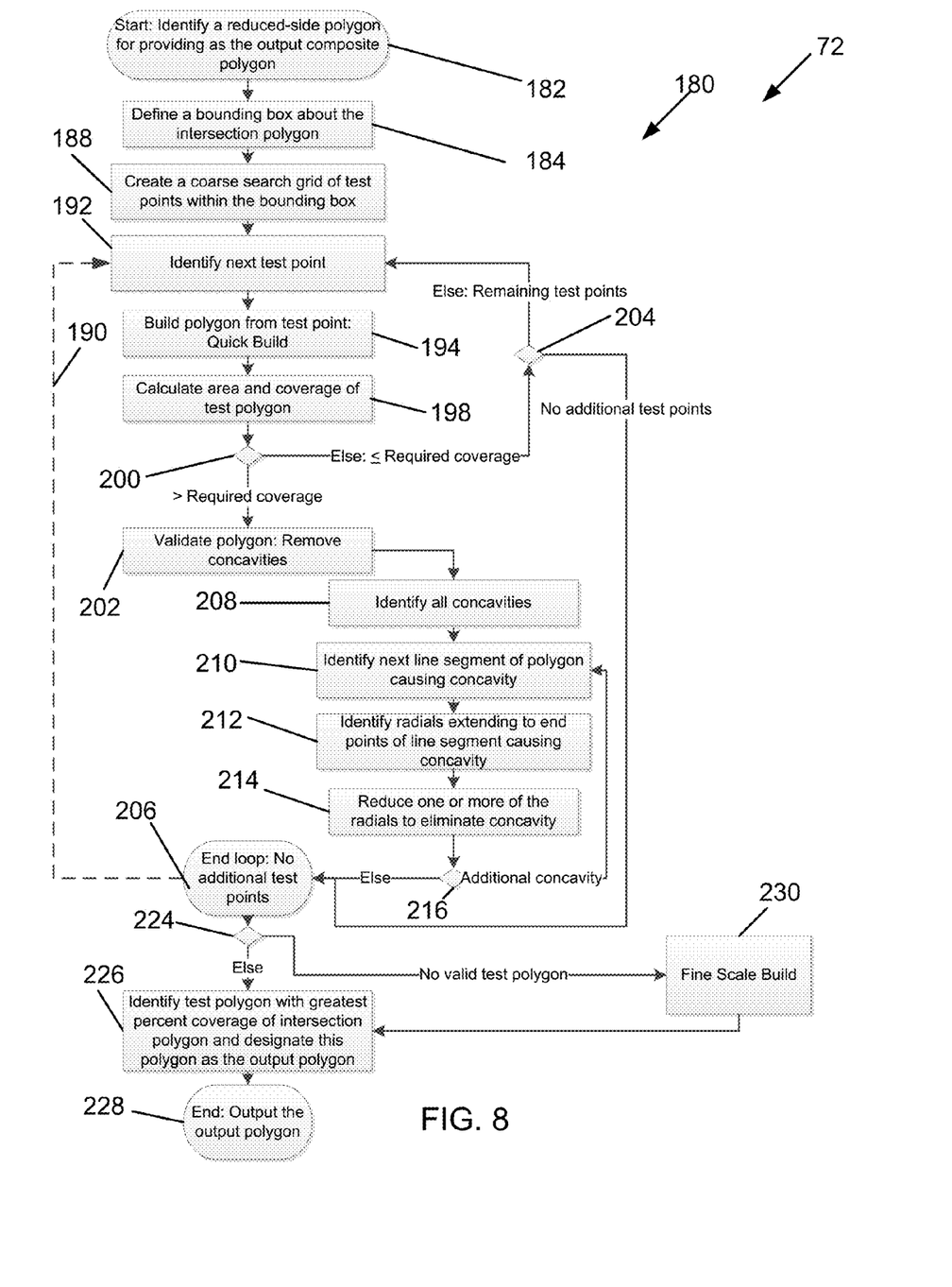
FIG. 8 illustrates a portion of the exemplary set of processor-executable instructions of FIG. 3.

Turning now to FIG. 8, the subroutine instructions/steps of block 72 are illustrated in further detail. A unique instruction subset 180 of the instructions 34 is provided for identifying a reduced-side polygon for providing as the output composite polygon LAR. The reduced-side polygon is provided to the pilot in place of the intersection polygon. This is done because the intersection polygon will typically have a greater number of sides than the initial LAR polygons. In this example, the initial LAR polygons have nine sides, and thus the intersection polygon may have many more than nine sides or less than nine sides after merging the plurality of initial polygons into the intersection polygon.

Typically, the electronics system of the plane and/or specifically of the cockpit may only be capable of receiving polygons having a set or threshold number of sides, such as that the display in the cockpit may not be capable of displaying a polygon having a greater number of sides than the initial polygons. Thus, an alternative polygon is provided in place of the intersection polygon for efficiency of data transfer and/or display capabilities, etc. In this case, instruction subset 180 provides a nine-sided composite output polygon LAR to the pilot, though it will be appreciated that a polygon having any suitable number of sides may be provided, including a polygon having a greater number of sides than the intersection polygon and/or the initial polygons.

This CLAR polygon provided to the pilot may include a threshold percentage of the intersection polygon. Thus, another input into the CLAR software may be to indicate that the CLAR polygon must have, for example, a minimum overlap percent with the intersection polygon of greater than 75%, preferably greater than 80%, and more preferably greater than 85%. Alternatively, any suitable threshold may be utilized, or no threshold may be utilized.

Turning to the subset 180, the subset is performed as part of block 72 (FIG. 3). Block 182 represents the start of the subroutine for identifying a reduced-sided polygon within the intersection polygon. At block 184, a bounding box is built about the intersection polygon, and at block 188, overlay points are laid over the intersection polygon. For example, a coarse search grid of test points is laid within the bounding box. The bounding box may have any suitable number of sides, such as four, and if suitable, the grid may be laid without the use of a bounding box.

The coarse search grid may be an M by P matrix of points laid with the bounding box, with M and P representing any suitable numbers. The grid is designated a coarse search grid as a fine search grid may later be used by the CLAR software, where the fine search grid includes a matrix of points having an increased number of points as compared to the coarse search grid. The distance between the points in the coarse search grid is determined by the CLAR software and may be provided as an input into the CLAR software. The input may include specific distances required between adjacent points of the matrix or a specific number of points to be fit into the matrix. Alternatively, blocks 184 and 188 may be replaced by another suitable process, such as where no bounding box is built about the intersection polygon and a random number of overlay points are randomly spaced over and adjacent to the intersection polygon.

A loop 190 next begins after block 188. The loop 190 includes the building of a test polygon from each of the overlay points. At block 192, the first test point is identified and a polygon is built from the test point at 194. This build is a quick build, as will be explained. Particularly, as with formation of the initial polygons, a suitable number of radials, such as nine radials, are extended from the test point. If the test point is within the intersection polygon, the radials are evenly spaced at 40 degree intervals, although any suitable spacing, even or otherwise, may be utilized. The radials are extended until they intersect with the sides of the intersection polygon, and endpoints of the radials are connected with line segments to form a first test polygon.

On the other hand, the test point may be without, or located outside of, the intersection polygon. In this case, radials are again extended from the test point, again such as nine radials, although any suitable number of radials may be used. Depending on the spacing between the radials, which is even in this example, the radials will include a subset that will intersect the intersection polygon and a subset that will never intersect the intersection polygon. For the subset that will intersect the intersection polygon, the radials will be extended until intersecting the farthest intersection polygon side from the test point. In other words, the radial may crossover one or more sides of the intersection polygon until reaching/intersecting a final side of the intersection polygon farthest from the test point. In this way, the greatest area of the intersection polygon will be defined within the test polygon. For the subset that will never intersect the intersection polygon, the radials are reversed, i.e., they are translated into negative radials, previously explained with reference to FIG. 5. As with the positive radials, the negative radials are extended until reaching/intersecting a final side of the intersection polygon farthest from the test point. The endpoints of each of the radials are connected by line segments, thus forming the test polygon.

Regardless of whether the test point is located within or outside of the intersection polygon, it is noted that the sides of the test polygon may intersect sides of the intersection polygon forming concavities. In other words, due to the connection of the end points of the radials, the entire area of the test polygon may not be located within the intersection polygon and may include some areas bounded within the test polygon that are outside of the intersection polygon, these areas disposed between sides of the test polygon and sides of the intersection polygon are called concavities. During the quick build, the concavities are not removed in order to not complete unnecessary steps, as each of the test polygons will not move onto next steps. Of course the CLAR software may be configured to remove concavities during the quick build if suitable.

After the quick build of a test polygon is completed, the area of the test polygon is calculated at test block 198. In addition, the percent coverage or overlap of the intersection polygon covered or encompassed by the test polygon is calculated. If the CLAR software is configured to include a required threshold coverage, the test polygon coverage is validated against this threshold at decision block 200.

At block 200, if the percentage coverage of the test polygon is less than or equal to the required threshold coverage, the test polygon does not move to step 202 where concavities are removed. It is noted that the CLAR software may alternatively be configured to separate between test polygons less than the threshold and greater than or equal to the threshold. If the test polygon does not move on to step 202, the CLAR software instead moves to decision block 204 and the test polygon is marked as invalid. At block 204 if test points remain, and thus a test polygon has not been formed from all test points, the CLAR software returns to block 192, identifying the next test point. On the other hand, if at block 204 no test points remain, and thus a test polygon has been formed from each test point, the CLAR software moves to loop end block 206.

If the percentage coverage of the test polygon is greater than the required threshold coverage, the test polygon moves on to step 202, beginning the process for removing concavities, and thus bringing all portions of all line segments of the test polygon within or on the intersection polygon. Concavities are removed because the concavities are within the intersection polygon and thus will misrepresent the common overlap area of the initial input polygons. At block/step 208 all concavities between the test polygon and the intersection polygon are identified. Next, the line segment of the test polygon causing the first concavity is identified at block 210, and the two radials extending to the end points of this line segment are identified at block 212.

At block 214, one or more of the radial offsets is reduced to remove the concavity. Thus, a radial is drawn back along its vector, rather than revising the angle of the radial relative to the other radials, although adjusting the angle of the radial also may be a suitable option in another embodiment of the subset 180. Within block 214, the CLAR software analyzes whether to reduce the length of both of the two radials, or only one of the radials, making the decision that least reduces the overall area of the test polygon while still eliminating the concavity. Of course the CLAR software may be configured to make the decision based on other criteria, such as the decision which reduces the least amount of offset length.

At decision block 216, the CLAR software determines whether additional concavities remain. If additional concavities remain, the CLAR software returns to block 210 to identify the next line segment of the test polygon causing a concavity. If no additional concavities remain, the CLAR software moves to block 206 ending the loop for building test polygons. If additional test points remain from which test polygons have not been formed, the loop 190 will again continue with block 192. On the other hand, if a test polygon has been formed from each test point, the CLAR software moves to decision block 224.

The CLAR software determines at block 224 whether any valid test polygons were formed, i.e. whether any polygons were formed having a threshold coverage of the intersection polygon. If at least one test polygon includes the threshold area, the CLAR software moves to block 226 where the test polygon having the greatest percent coverage of the intersection polygon is designated as the output polygon and thus as the composite LAR (CLAR), which will be output to the pilot display. At this point, the subset 180 will end at end block 228 with the CLAR being output to block 74 (FIG. 3).

On the other hand if no valid test polygons were formed, i.e., no test polygons included threshold coverage of the intersection polygon, a fine scale build process is completed at block 230. The fine scale build process is similar to the coarse scale build process previously defined. The test polygons output from the coarse scale build process are analyzed and the test polygon having the greatest percent coverage of the intersection polygon is identified, regardless that this test polygon does not include the threshold coverage. A bounding box, if suitable, may be formed about the chosen test polygon. Overlay points are laid over the chosen test polygon. The points have a tighter arrangement as compared to the points of the coarse overlay, and thus the distance between points is reduced as compared to the distance between points of the coarse overlay. A test polygon is formed from each test point via a fine scale build process, which includes each of the previously described quick build process and the concavity removal process.

After a test polygon is formed from each test point of the fine overlay, the CLAR software moves to block 226 where the test polygon having the greatest percent coverage of the intersection polygon is designated as the output polygon and thus as the composite LAR (CLAR), which will be output to the cockpit system. At this point, the subset 180 will end at end block 228 with the CLAR being output to block 74 (FIG. 3).

In another embodiment, the CLAR software may simultaneously analyze all or a subset of the test polygons formed from the coarse and/or fine overlay test points. In this manner, calculation time of this subroutine may be reduced. Additionally or alternatively, the CLAR software may simultaneously analyze test polygons based upon a plurality of different threshold overlap values (of the test polygons as compared to the intersection polygon), which may be provided to the CLAR software as input values.

In summary, a unique software is provided for functioning in conjunction with a plurality of mission stores and for assisting a pilot of a vehicle with release of the mission stores to achieve a specified number of mission objectives. Each of the plurality of mission stores may be designated for communication with a separate mission reference point or target. The targets may be grouped within a common target area. The software provides processor-executable instructions for determining acceptable timing and location for release of the plurality of mission stores, such as within the common target area, and such that the mission stores achieve communication with the respective mission reference points. The processor-executable instructions calculate and identify a common release area within the common target area, such as a composite launch acceptability region of overlap of separate target regions of each mission store, in addition to identifying an entrance and exit point of the composite region.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A computer-readable medium having processor-executable instructions implementable to calculate a composite launch acceptability region, the instructions including:
    forming a plurality of initial polygons, each including one of a plurality of target reference points, and each defined by a plurality of interconnected segments;
    forming an intersection polygon, the intersection polygon including an area of overlap of each of the plurality of initial polygons;
    overlaying a set of points over the intersection polygon and forming about each of the set of points a test polygon having a different number of sides as compared to the intersection polygon;
    identifying a test polygon including the greatest area of coverage of the intersection polygon; and
    outputting the test polygon as the composite launch acceptability region.

2. The computer-readable medium of claim 1, with the instructions further including receiving a vector input, calculating based on the vector input an entry point and an exit point of the vector through the composite launch acceptability region.

3. The computer-readable medium of claim 2, wherein for each initial polygon, the plurality of radials are equally circumferentially spaced.

4. The computer-readable medium of claim 2, wherein a first radial of the plurality of radials is directed in a direction opposite a direction of travel of the vehicle, and wherein the other of the plurality of radials are equally-circumferentially spaced with regards to the first radial.

5. The computer-readable medium of claim 2, wherein each radial of the plurality of radials extends a different length from the respective target reference point.

6. The computer-readable medium of claim 1, wherein each initial polygon is formed by extending from the respective target reference point a plurality of radials, the radials extending to distal vertices, and the distal vertices being interconnected by line segments to form the respective initial polygon.

7. The computer-readable medium of claim 1, with the instructions further including removing any one of the plurality of initial polygons that completely encompasses another one of the plurality of initial polygons.

8. The computer-readable medium of claim 1, wherein the forming a test polygon includes extending a plurality of radials from the respective test point, the radials each intersecting the intersection polygon.

9. The computer-readable medium of claim 1, wherein the forming of an intersection polygon includes selecting a first initial polygon and tracing along the first initial polygon until reaching an intersection with a second initial polygon, continuing tracing along a chosen line segment of the first or second initial polygon where the chosen line segment is located in or on each of the first or second initial polygons, continuing tracing along the initial polygon including the chosen line segment until reaching another intersection of the first and second initial polygons, and continuing to toggle between tracing of the first initial polygon and tracing of the second initial polygon until an intersection polygon is fully traced, the intersection polygon including an overlapping area of each of the first and the second initial polygons.

10. The computer-readable medium of claim 1, further including analyzing a test polygon to determine if the test polygon includes a portion of its area that is disposed outside of the intersection polygon.

11. The computer-readable medium of claim 10, with the instructions further including adjusting a side of the test polygon to place the side within the intersection polygon, thus eliminating the portion of the test polygon area that is disposed outside of the intersection polygon.

12. The computer-readable medium of claim 1, with the instructions further including analyzing a test polygon to determine if the test polygon includes a portion of its area that is disposed outside of the intersection polygon, and adjusting the length of one or more radials of the test polygon to eliminate the portion of the test polygon area that is disposed outside of the intersection polygon.

13. A computer-readable medium having processor-executable instructions implementable to calculate a composite launch acceptability region, the instructions including:

forming a plurality of initial polygons, each including one of a plurality of target reference points, and each defined by a plurality of interconnected segments;

forming an intersection polygon, the intersection polygon including an area of overlap of each of the plurality of initial polygons, and the forming of an intersection polygon including:

selecting a first initial polygon and tracing along the first initial polygon until reaching an intersection with a second initial polygon;

continuing tracing along a chosen line segment of the first or second initial polygon where the chosen line segment is located in or on each of the first or second initial polygons;

continuing tracing along the initial polygon including the chosen line segment until reaching another intersection of the first and second initial polygons; and continuing to toggle between tracing of the first initial polygon and tracing of the second initial polygon until an intersection polygon is fully traced, the intersection polygon including an overlapping area of each of the first and the second initial polygons; and outputting a polygon including only overlapped portions of two or more of the initial polygons as the composite launch acceptability region.

14. The computer-readable medium of claim 13, with the instructions further including receiving a vector input, calculating based on the vector input an entry point and an exit point of the vector through the composite launch acceptability region.

15. The computer-readable medium of claim 13, wherein each initial polygon is formed by extending from the respective target reference point a plurality of radials, the radials extending to distal vertices, and the distal vertices being interconnected by line segments to form the respective initial polygon.

16. The computer-readable medium of claim 15, wherein for each initial polygon, the plurality of radials are equally circumferentially spaced.

17. The computer-readable medium of claim 13, with the instructions further including removing any one of the plurality of initial polygons that completely encompasses another one of the plurality of initial polygons.

18. A computer-implemented method of forming a composite launch acceptability region from a plurality of separate target launch acceptability regions, the computer-implemented method including:

forming a plurality of initial polygons representing the plurality of separate target launch acceptability regions, each including one of a plurality of target reference points, and each defined by a plurality of interconnected segments;

forming an intersection polygon, the intersection polygon including an area of overlap of each of the plurality of initial polygons;

overlaying a set of points over the intersection polygon and forming about each of the set of points a test polygon having a different number of sides as compared to the intersection polygon;

identifying a test polygon including the greatest area of coverage of the intersection polygon; and outputting the test polygon as the composite launch acceptability region.

19. The computer-implemented method of claim 18, wherein each initial polygon is formed by extending from the respective target reference point a plurality of radials, the radials extending to distal vertices, and the distal vertices being interconnected by line segments to form the respective initial polygon.

20. The computer-implemented method of claim 18, wherein the forming of an intersection polygon includes selecting a first initial polygon and tracing along the first initial polygon until reaching an intersection with a second initial polygon, continuing tracing along a chosen line segment of the first or second initial polygon where the chosen line segment is located in or on each of the first or second initial polygons, continuing tracing along the initial polygon including the chosen line segment until reaching another intersection of the first and second initial polygons, and continuing to toggle between tracing of the first initial polygon and tracing of the second initial polygon until an intersection polygon is fully traced, the intersection polygon including an overlapping area of each of the first and the second initial polygons.

* * * * *